APPARATUS FOR CONTROLLING NEGATIVE CONDUCTANCE DIODES

Filed Nov. 27, 1959 3 Sheets-Sheet 1

INVENTORS
HAROLD M. WASSON &
OJARS RAMANIS

BY J. L. Whittaker
ATTORNEY

INVENTORS
HAROLD M. WASSON &
OJARS RAMANIS

BY J. L. Whittaker
ATTORNEY

APPARATUS FOR CONTROLLING NEGATIVE CONDUCTANCE DIODES

INVENTORS
HAROLD M. WASSON &
OJARS RAMANIS
BY
ATTORNEY

United States Patent Office 3,108,233
Patented Oct. 22, 1963

3,108,233

APPARATUS FOR CONTROLLING NEGATIVE CONDUCTANCE DIODES

Harold M. Wasson, Severna Park, Md., and Ojars Ramanis, Haddonfield, N.J., assignors to Radio Corporation of America, a corporation of Delaware
Filed Nov. 27, 1959, Ser. No. 855,898
14 Claims. (Cl. 332—52)

This invention relates generally to improved methods of and means for controlling the operating characteristics of negative conductance semiconductor diodes and particularly to improved methods of and means for modifying said characteristics by applying radio frequency energy to said diodes.

An early form of such negative conductance diodes is described by Leo Esaki in Physical Review, vol. 109, page 603 (1958).

A particular form of such a negative conductance diode especially useful with the instant invention is known as a tunnel diode. Such tunnel diodes are semiconductor devices employing a very thin, or abrupt, p-n junction, the transition region from p-type conductivity to n-type conductivity preferably being less than 200 A. In preferred types of tunnel diodes, the semiconductor has a moderate band-gap and both sides of the p-n junction are doped (i.e. contain conductivity-type-determining impurities) almost to the point where the semiconductor becomes polycrystalline, in order to provide a very high concentration of free charge carriers. Such diodes conduct current in the forward direction by two processes: at low voltages conduction is principally by quantum mechanical tunneling of charge carriers through the depletion region of the p-n junction. Such current due to tunneling rises rapidly to a maximum and then falls to zero over a short range of forward bias voltage, generally less than 1 volt, and provides the negative conductance characteristic. At higher voltages the current is due to charge carriers passing over the barrier of the p-n junction.

Thus a tunnel diode exhibits a positive resistance characteristic for very small forward bias voltages, a negative resistance characteristic for intermediate values of forward bias voltages, and a positive resistance for higher values of forward bias voltages. Stated in another manner, as the forward voltage applied to such a voltage controlled negative resistance diode is continuously increased from zero, the diode current first increases to a relatively sharp maximum value, then decreases to a relatively deep and broad minimum, and thereafter again increases. As used herein, a voltage controlled negative resistance diode means a diode having an N-shaped current-voltage characteristic. For presently known types of negative resistance germanium diodes, an exemplary voltage range over which the diode exhibits a negative resistance characteristic is from 50 to 350 millivolts (mv.). The negative resistance of the diode, which is the reciprocal negative slope of its current-voltage characteristic, depends on the construction of the diode.

A major difficulty in adapting negative conductance diodes to electronic circuits such as amplifiers, modulators and switching circuits, is the provision of control or stabilizing circuits to provide independent control of the diode negative resistance characteristic.

An important object of the invention is to provide improved methods of and means for controlling electronic circuits employing negative conductance voltage-controlled semiconductor diodes including tunnel diodes.

Another object is to provide novel methods of and means for controlling the current-voltage characteristics of a negative resistance device such as a tunnel diode.

A further object is to provide improved methods of and means for providing effectively independent control of the operating characteristics of a tunnel diode circuit.

An additional object is to provide improved methods of and means for controlling, stabilizing or modulating the output signals of an oscillation generator employing a tunnel diode.

Another object is to provide improved methods of and means for controlling, regulating or stabilizing the operating characteristics of amplifier, modulator or other circuits employing negative resistance devices such as a tunnel diode.

A further object is to provide improved methods of and means for employing radio frequency energy to modify the normal negative resistance characteristics of a negative resistance diode such as a tunnel diode.

An additional object is to provide improved methods of and means for modulating a tunnel diode oscillator in response to modulated radio frequency energy.

It has been known that, under certain special conditions of network admittance, microwave injection at frequencies in the region of 3000 to 30,000 mc. could introduce negative conductance characteristics in some special types of welded-contact semiconductor diodes which normally had only positive conductance characteristics. No such phenomenon is known to have been observed with other types of semiconductor diodes. The theory for such a phenomenon has not been completely understood.

We have now found that the negative conductance portion of the operating characteristic of a voltage-controlled semiconductor device such as a tunnel diode can be reduced or changed in shape or slope by injection of much lower radio frequencies such, for example, as in the range of 40 to 300 mc. The radio frequency injection tends to change the normal negative conductance properties of the device, and may either eliminate such properties or provide a plurality of negative conductance portions to replace a single such portion. The manner that the negative conductance characteristic changes does not appear to be related closely to the injected frequency.

This unexpected phenomenon can be utilized in accordance with the invention to control or stabilize the gain of tunnel diode amplifiers, to control or to stabilize the output amplitude of tunnel diode oscillators, or to modulate the output of such oscillators in accordance with either amplitude modulation or frequency modulation of the radio frequency injection source. Thus, in addition, the invention includes novel modulation conversion techniques.

A typical embodiment of the invention comprises a tunnel diode biased to a point on the negative conductance portion of its operating characteristic. The diode is connected in an oscillatory LC circuit to generate oscillations at a frequency such, for example, as 1.2 mc. The amplitude of the oscillations at 1.2 mc. may be controlled, and if sufficient energy is supplied, may even be suppressed, by injection into the oscillatory circuit of energy at other radio frequencies such, for example, as in the region of 30 to 300 mc.

Another embodiment employs an amplitude-modulated injection frequency source which thus provides similar amplitude modulation of the 1.2 mc. oscillations.

A modification of said latter embodiment converts frequency modulation of the injection frequency to amplitude modulation of the 1.2 mc. oscillations by coupling the injection source through a series-resonant circuit to the diode oscillatory circuit.

A further embodiment comprises a tunnel diode amplifier, the gain of which is controlled by an injection frequency source coupled thereto.

A modification of said amplifier comprises an injection frequency source modulated by the output signals from the tunnel diode to provide degenerative feedback.

Any of said embodiments may be controlled, stabilized, keyed or switched as desired, by appropriate selection of modulating waves or pulses or other controls for changing the injection signals applied to the diode circuit.

The invention and typical embodiments thereof will be described in greater detail by reference to the accompanying drawings wherein similar reference characters are applied to similar elements, and wherein.

Figure 7:
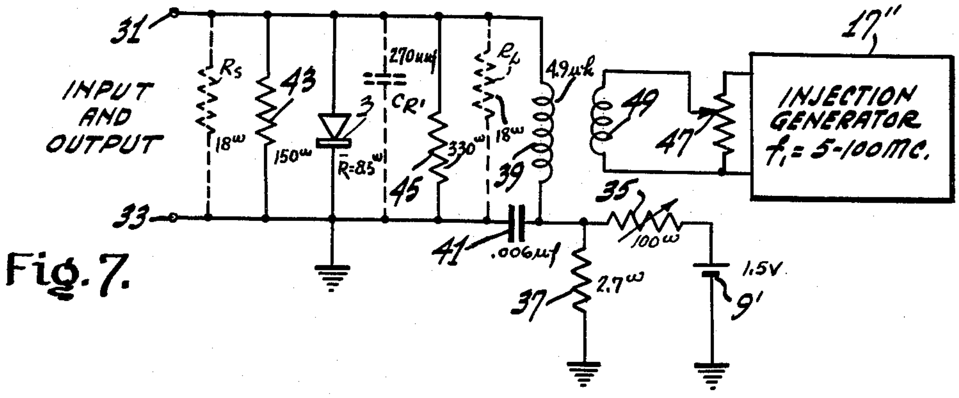
FIG. 7 is a partially block, schematic circuit diagram of an amplifier according to the invention.
Figure 8:
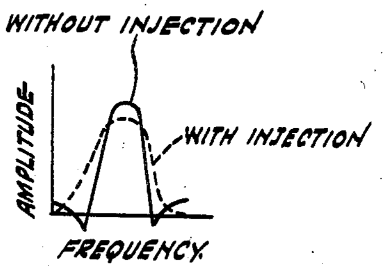
Figure 9:
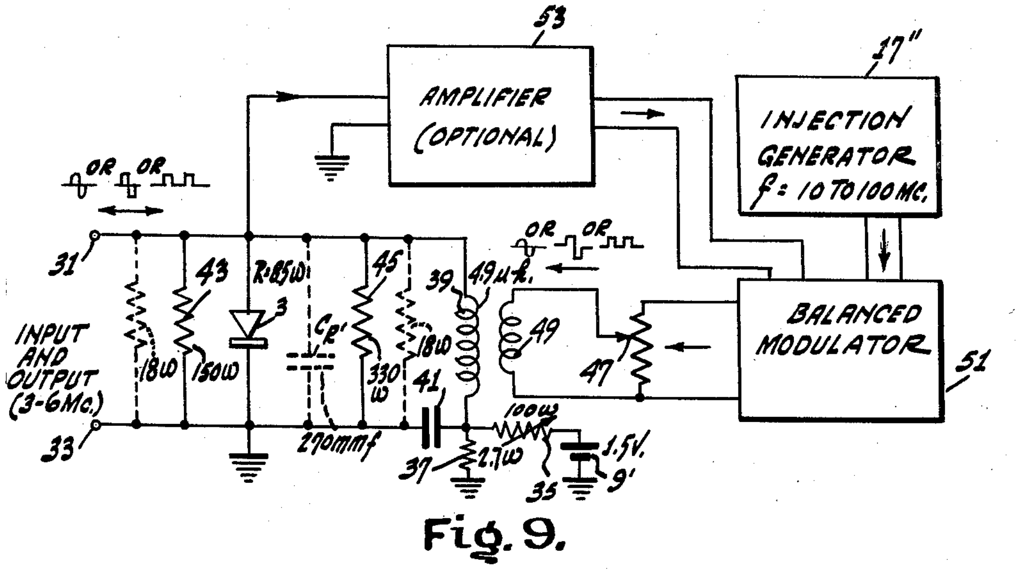

FIG. 8 includes graphs exemplifying the frequency response of an amplifier such as shown in FIG. 7, illustrative of the effects of injection energy or lack thereof in said diode amplifier; and FIG. 9 is a partially block, schematic circuit diagram of a feedback amplifier in accordance with the invention.

A diode which could be used in practicing the invention includes a single crystal of n-type germanium which is doped with arsenic to have an atomic donor concentration of about $4.0 \times 10^{19}$ cm.$^{-3}$ by methods known in the semiconductor art. This may be accomplished, for example, by pulling a crystal from molten germanium containing the requisite concentration of arsenic. A wafer is cut from the crystal ingot along the 111 plane, i.e. a plane perpendicular to the 111 crystallographic axis of the crystal. The wafer is etched to a thickness of about 2 mils with a conventional etch solution. A major surface of this wafer is soldered to a strip of a conductor, such as nickel, with a conventional lead-tin-arsenic solder, to provide a non-rectifying contact between the wafer and the strip. The nickel strip serves eventually as a base lead. A 5 mil diameter dot of 99 percent by weight indium, 0.5 percent by weight zinc and 0.5 percent by weight gallium is placed with a small amount of a commercial flux on the opposite surface of the germanium wafer and then heated to a temperature in the neighborhood of 450° C. for one minute in an atmosphere of dry hydrogen to alloy a portion of the dot to said opposite surface of the wafer, and then cooled rapidly. In the alloying step, the unit is heated and cooled as rapidly as possible so as to produce an abrupt p-n junction. The unit is then given a final dip etch for 5 second in a slow iodide etch solution, followed by rinsing in distilled water.

A suitable slow iodide etch is prepared by mixing one drop of a solution comprising 0.55 gram potassium iodide, and 100 cm.$^3$ water in 10 cm.$^3$ concentrated acetic acid, and 100 cm.$^3$ concentrated hydrofluoric acid.

A typical semiconductor device, prepared according to the above example, exhibits the following characteristics:

$\overline{R}$=8.5 ohm ($\omega$)
C=270 micromicrofarads ($\mu\mu$f.)
$\overline{R}$C=2.295 millimicroseconds (m$\mu$s.)

Where $\overline{R}$ is the value of the diode negative resistance (at the inflection point of the I-V characteristic); C is the capacitance of the junction at the same point of the diode characteristic; and $\overline{R}$C is the approximate time constant determining the frequency characteristic of the diode.

Other semiconductors may be used instead of germanium, particularly silicon and the III-V compounds. A III-V compound is a compound composed of an element from each of group III and group V of the periodic table of chemical elements, such as gallium arsenide, indium arsenide and indium antimonide. Where III-V compounds are used, the p and n type impurities ordinarily used in those compounds are also used to form the diode described. Thus, sulfur is a suitable n-type impurity and zinc a suitable p-type impurity which is also suitable for alloying.

Figure 1:
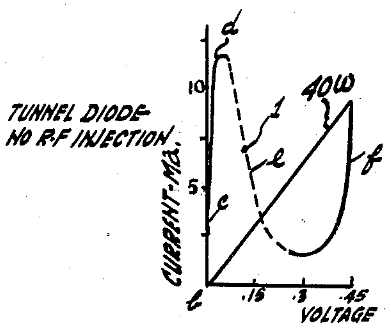
FIGS. 1–4 are graphs showing the voltage-current operating characteristics of a typical tunnel diode, referenced to a 40 ohm calibrating resistor, illustrative of the change in said characteristics with successively increased amplitude of injection frequency energy.

The current-voltage characteristic of a typical diode suitable for use with circuits embodying the invention is shown in FIGURE 1. The current scales depend on area and doping of the junction.

For a small voltage in the back direction, the back current of the diode increases as a function of voltage as is indicated by the region *b* of FIGURE 1.

For small forward bias voltages, the initial forward current increases gradually due to the tunneling effect of charge carriers as explained by quantum mechanics. At higher forward bias voltages, the forward current due to tunneling reaches a maximum (region *d*, FIGURE 1), and then begins to decrease. This drop continues (FIGURE 1, region *e*) until eventually normal injection over the barrier becomes important and the characteristic turns into the usual forward behavior, (region *f*, FIGURE 1).

The dynamic resistance of the diode is the incremental change in voltage divided by the incremental change in current, or the reciprocal slope of the region *e* of FIGURE 1. To establish a stable operating point for the diode in the negative resistance region of its characteristic requires a suitable voltage source having a smaller internal impedance than the negative resistance of the diode.

FIGURE 1 of the drawings is illustrative of the variation in current as a function of forward voltage through a typical tunnel diode with no radio frequency injection as compared with the current-voltage characteristic of a 40 ohm calibrating resistor. The dash line portion *e* of the diode characteristic is the so-called negative resistance or negative conductance region. In accordance with the invention, the diode is biased in the forward direction to operate at a desired point 1 on said negative resistance region *e*.

Figure 2:
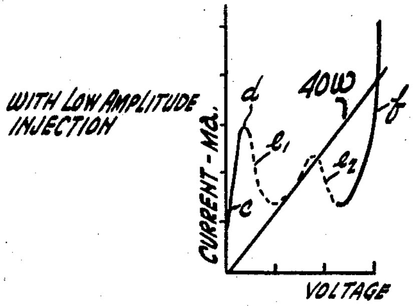

FIGURE 2 shows the type of double peaked operating characteristic of a typical tunnel diode when radio frequency energy at a frequency, for example, in the region of 5 to 300 megacycles, is applied thereto. It is noted that this injection provides two negative resistance portions denoted by the dash lines $e_1$ and $e_2$. The initial positive slope portion *c* and the final positive slope portion *f* are substantially unchanged although the amplitude of the initial peak *d* is reduced. The reasons for this phenomenon are not completely understood.

Figure 3:
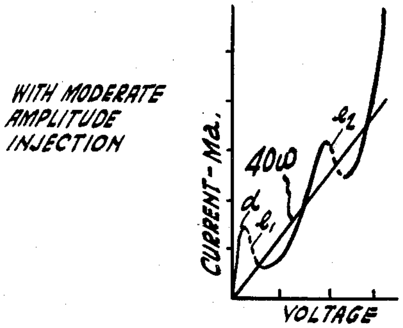

A further increase in radio frequency energy applied to the diode further changes the diode operating characteristic to the form shown in FIGURE 3 wherein the initial peak *d* is further reduced in amplitude and the negative resistance portions $e_1$ and $e_2$ cover a much smaller current range.

Figure 4:
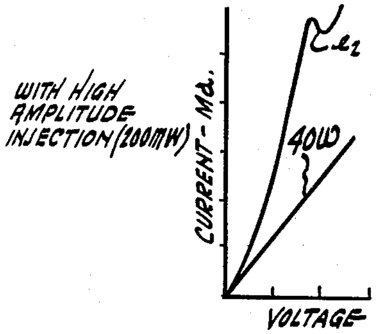

FIGURE 4 is illustrative of even higher amplitude radio frequency injection wherein radio frequency energy of the order of 200 milliwatts is applied to a typical tunnel diode. It will be noted that the initial peak *d* and the initial negative resistance region $e_1$ are both eliminated and the secondary negative resistance region $e_2$ also is substantially eliminated. A further sufficient increase in the amplitude of radio frequency injection would eliminate the negative resistance region $e_2$ of the device characteristic. It is emphasized that the radio frequency injection thus flattens out the diode characteristic in the negative resistance region, but does not increase the characteristic slope. The injection does not reduce the negative resistance directly, but in effect increases it to infinity where it becomes a positive resistance.

Figure 5:
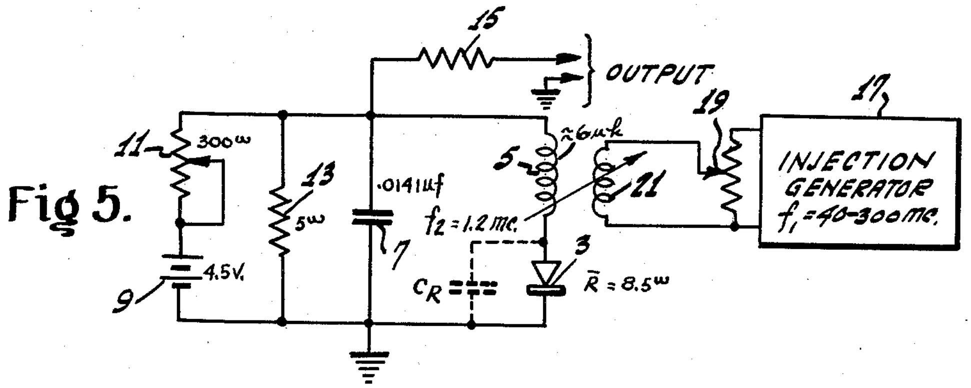
FIG. 5 is a partially block, schematic circuit diagram of an oscillator according to the invention.

FIGURE 5 shows a typical radio frequency oscillator circuit in accordance with the invention employing a tunnel diode 3 having an effective negative resistance of 8.5 ohms at the inflection point 1 in its operating characteristic. The effective capacitance $C_T$ of the diode at the same point 1 is of the order of 270 micro-microfarads. A tank circuit comprising an inductor 5 of about 6 microhenries and said capacitance $C_T$, with a series blocking and bias circuit by-pass capacitor 7 of about .0141 microfarad, resonates at a frequency of about 1.2 megacycles. The by-pass capacitor 7 also effectively overdamps the bias voltage circuit to prevent parasitic oscillations.

An operating potential of about 100 millivolts to bias the diode 3 at the inflection point 1 on its negative resistance characteristic is provided by a battery 9 through a series adjustable 300 ohm resistor 11, both of the latter shunted by a 5 ohm resistor 13. By selecting the shunt resistor 13 to have a positive resistance value lower than the effective negative resistance value of the tunnel diode, the diode may be stably biased in its negative resistance region.

Output from the oscillator may be derived through an isolating resistor 15 coupled, for example, to the junction of the inductor 5 and by-pass capacitor 7.

Radio frequency energy, preferably in the frequency range of 40 to 300 megacycles, derived from an injection generator 17 having an output amplitude control 19 is applied to a coupling coil or loop 21 which is loosely coupled to the tank circuit inductor 5. Adjustment of either the output amplitude control 19 and/or the coupling between the inductors 21 and 5 controls the amount of radio frequency energy injected into the tunnel diode oscillator, to control its current-voltage characteristic which, in turn, controls the amplitude of oscillations at its operating frequency of 1.2 megacycles. In a similar manner the injection generator 17 could be amplitude-modulated in any desired manner to amplitude-modulate the tunnel diode oscillating frequency of 1.2 megacycles.

Figure 6:
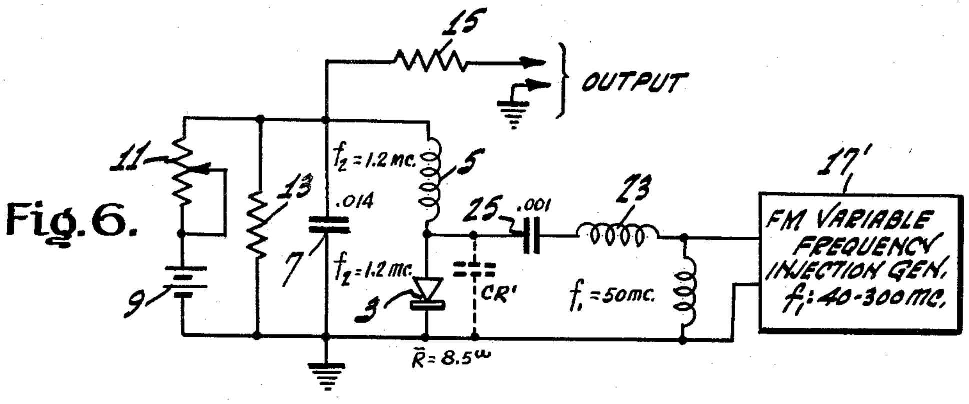
FIG. 6 is a partially block, schematic circuit diagram of a modification of the oscillator circuit of FIG. 5 wherein the injection frequency source is frequency-modulated.

The oscillation tank circuit and bias voltage circuit portions of the oscillator circuit of FIGURE 6 are similar to the corresponding portions of the circuit of FIGURE 5. However, by the use of a frequency-sensitive coupling circuit between the injection generator and the tunnel diode, the circuit of FIGURE 6 provides an output amplitude at 1.2 megacycles which is dependent upon the frequency of the injection generator. If desired, the injection generator 17′ may be frequency-modulated, whereby said frequency modulation is converted to amplitude modulation of the tunnel diode 1.2 megacycle oscillations. The variable frequency, or frequency modulated, injection generator 17′ is coupled to the tunnel diode through a series-resonant circuit including an inductor 23 and series-connected capacitor 25 to the junction of the tunnel diode 3 and the tank inductor 5.

FIGURE 7 shows a typical tunnel diode amplifier circuit having common input and output terminals 31, 33 shunted by the tunnel diode 3. The bias potential for operating the tunnel diode 3 at a selected point on its negative resistance characteristic is provided by a 1.5 volt battery 9′ coupled through an adjustable 100 ohm series resistor 35, both of which are shunted by a 2.7 ohm resistor 37.

The common terminal of the resistors 35 and 37 is coupled through a 4.9 microhenry inductor 39 to one terminal of the diode 3 and to one terminal of a .006 microfarad by-pass capacitor 41. The remaining terminal of the by-pass capacitor 41 and the other terminal of the diode 3 are connected to the remaining terminal of the battery 9′. The inductance of the inductor 39 preferably is selected to resonate the capacitance of the diode to the operating frequency of the amplifier. Matching 150 ohm and 330 ohm resistors 43, 45, respectively, are connected in shunt with the diode and the source of load conductances, represented by the dashed line resistors $R_S$ and $R_L$, respectively, each of about 18 ohms. The combined values of matching conductances and source of load conductances should exceed the negative conductance of the diode for stable amplification. Adjusting the relative values of said conductances adjusts the gain of the amplifier.

An independent control of the amplifier gain is provided by coupling an injection generator 17″ having an output frequency of 5 to 100 mc.; for example, through a potentiometer 47 and a coil 49 loosely coupled to the inductor 39. The amplitude of the injected radio frequency energy may be controlled or adjusted in any other conventional manner.

The amplitude characteristic as a function of frequency of a typical tuned tunnel diode amplifier is shown in the dash line curve of FIG. 8 when sufficient radio frequency energy is injected into the diode to overcome circuit instability. The solid line curve indicates a typical response characteristic without radio frequency injection.

FIGURE 9 shows a typical 3–6 mc. band-pass amplifier embodiment of the invention wherein AGC is provided. The circuit is similar to that described by reference to FIG. 7 except that the amplitude of the radio frequency signals from the injection generator 17″ is controlled by a balanced modulator or other suitable circuit 51 responsive to the output signal amplitude of the tunnel diode amplifier. The AGC loop may include an amplifier 53 if desired. The AGC loop gain is controllable, for example, by the potentiometer 47.

The circuit of FIG. 9 is especially useful for amplifying pulses of any desired polarities as well as sinusoidal or complex waveforms.

What is claimed is:

1. In combination, a semiconductor tunnel diode having an operating characteristic with positive conductance portions separated by a negative conductance portion, means including an oscillatory circuit coupled to said diode to operate said diode in said negative conductance characteristic portion during at least a portion of its operating time to generate oscillations at a first frequency determined by said oscillatory circuit means and said device, means for applying radio frequency energy at a second frequency to said diode during at least a part of said portion of time to effectively change said negative conductance characteristic portion to reduce the amplitude of said first frequency oscillations, and circuit means coupled to said diode for deriving an output signal of said first frequency.

2. In combination, a semiconductor tunnel diode having an operating characteristic with positive conductance portions separated by a negative conductance portion, means including an oscillatory circuit coupled to said diode to operate said diode in said negative conductance characteristic portion during at least a portion of its operating time to generate oscillations at a first frequency, means for applying radio frequency energy at a second frequency to said diode during at least a part of said portion of time to effectively change said negative conductance characteristic portion, means for modulating said second frequency energy to modulate said first frequency oscillations, and output circuit means coupled to said diode for deriving a modulated output signal of said first frequency.

3. In combination, a semiconductor tunnel diode having an operating characteristic with positive conductance portions separated by a negative conductance portion, means including an oscillatory circuit coupled to said diode to operate said diode in said negative conductance characteristic portion during at least a portion of its operating time to generate oscillations at a first frequency, means for applying radio frequency energy at a second frequency to said diode during at least a part of said portion of time to effectively change said negative conductance characteristic portion, means for amplitude modulating said second frequency energy to amplitude modulate said first frequency oscillations, and output circuit means coupled to said diode for deriving an amplitude modulated output signal of said first frequency.

4. In combination, a semiconductor tunnel diode having an operating characteristic with positive conductance portions separated by a negative conductance portion, means including an oscillatory circuit coupled to said diode to operate said diode in said negative conductance characteristic portion during at least a portion of its operating time to generate oscillations at a first frequency, means for applying radio frequency energy at a second frequency to said diode during at least a part of said portion of time to effectively change said negative conductance characteristic portion, means for frequency modulating said second frequency energy to amplitude modulate said first frequency oscillations, and circuit means coupled to said diode for deriving an amplitude modulated output signal of said first frequency.

5. In combination, a semiconductor tunnel diode amplifier having an operating characteristic with positive conductance portions separated by a negative conductance portion, means including an operating circuit coupled to said diode to operate said diode in said negative conductance characteristic portion during at least a portion of its operating time, means providing a signal input circuit and a signal output circuit for signal modulated waves of a first frequency to said diode, and additional circuit means coupled to said diode for applying modulated radio frequency energy of a second frequency to said diode during at least a part of said portion of time to effectively change said negative conductance characteristic portion to control the gain of said amplifier.

6. In combination, a semiconductor tunnel diode amplifier having an operating characteristic with positive conductance portion separated by a negative conductance portion, means including an operating circuit coupled to said diode to operate said diode in said negative conductance characteristic portion during at least a portion of its operating time, means providing a signal input circuit and a signal output circuit for signal modulated waves of a first frequency to said diode, and additional circuit means coupled to said diode for applying pulsed radio frequency energy to said diode during at least a part of said portion of time to effectively change said negative conductance characteristic portion to control the gain of said amplifier.

7. In combination, a semiconductor tunnel diode amplifier having an operating characteristic with positive conductance portions separated by a negative conductance portion, means including an operating circuit coupled to said diode to operate said diode in said negative conductance characteristic portion, signal input and output connections to said diode, and means responsive to output signals from said diode for applying modulated radio frequency energy to said diode to effectively change said negative conductance characteristic portion to stabilize the gain of said amplifier.

8. In combination, means for generating wave energy of a first frequency in a circuit including a semiconductor tunnel diode having a negative resistance operating characteristic, means for applying radio frequency energy of a second frequency to said diode to change said negative resistance characteristic, means for modulating said radio frequency energy and output circuit means coupled to said diode for deriving wave energy of said first frequency.

9. In combination, means for generating wave energy of a first frequency in a circuit including a semiconductor tunnel diode having a negative resistance operating characteristic, means for applying radio frequency energy of a second frequency to said diode to change said negative resistance characteristic as a function of the amplitude of said radio frequency energy, means for amplitude modulating said radio frequency energy and output circuit means coupled to said diode for deriving wave energy of said first frequency.

10. In combination, a tunnel diode having a current-voltage characteristic exhibiting a negative resistance region, circuit means for waves of a first frequency coupled to said diode to operate said diode in said negative resistance region during at least a portion of its operating cycle, means for applying radio frequency waves of a second frequency to said diode to modify the slope of the negative resistance region of the current-voltage characteristic of said diode, and output circuit means coupled to said diode for deriving waves of said first frequency.

11. In combination, a tunnel diode having a current-voltage characteristic which exhibits a negative resistance region, means for biasing said diode in said negative resistance region, an operating circuit coupled to said diode to cause said diode to generate oscillations of a first frequency, output circuit means coupled to said diode for deriving oscillations of said first frequency, and means for applying radio frequency energy of a second frequency to said diode to modify the slope of the negative resistance region of its current-voltage characteristic.

12. In combination, a tunnel diode having current-voltage characteristic which includes positive conductance regions separated by a negative conductance region, means for biasing said diode in said negative conductance region, an operating circuit coupled to said diode to cause said diode to operate in said negative conductance region during at least a portion of its operating cycle in order to generate oscillations of a first frequency, output circuit means coupled to said diode for deriving oscillations at said first frequency, and means for applying radio frequency energy of a second frequency to said diode during at least a part of said operating cycle to modify the slope of the negative conductance region of the current-voltage characteristic of said diode.

13. In combination, a tunnel diode having a current voltage characteristic which exhibits a negative resistance region, means for biasing said diode in said negative resistance region, input circuit means for applying a signal to be amplified to said diode, output circuit means coupled to said diode for deriving an amplified replica of said input signal, and means for applying radio frequency energy to said diode to modify the slope of the negative resistance region of its current voltage characteristic.

14. In combination, means for generating wave energy of a first frequency in a circuit including a tunnel diode having a current voltage characteristic which exhibits a negative resistance region, a source of frequency modulated radio frequency energy, a frequency responsive network connecting said source of radio frequency energy to said diode to change the slope of the negative resistance region of said diode as a function of the frequency of said radio frequency energy, and output circuit means coupled to said diode for deriving waves of said first frequency.

References Cited in the file of this patent

UNITED STATES PATENTS

| | | |
|---|---|---|
| 2,469,569 | Ohl | May 10, 1949 |
| 2,666,816 | Hunter | Jan. 19, 1954 |
| 2,735,011 | Dickinson | Feb. 14, 1956 |
| 2,899,652 | Read | Aug. 11, 1959 |
| 2,997,604 | Shockley | Aug. 22, 1961 |

FOREIGN PATENTS

| | | |
|---|---|---|
| 158,879 | Australia | Sept. 16, 1954 |
| 159,041 | Australia | Sept. 27, 1954 |

OTHER REFERENCES

Publication 1, Physical Review, volume 109, page 603 (1958).